US010156183B2

United States Patent
Krajenke et al.

(10) Patent No.: US 10,156,183 B2
(45) Date of Patent: Dec. 18, 2018

(54) ANTI-RATTLE DEVICES AND TURBOCHARGER WASTEGATE ASSEMBLIES INCLUDING THE SAME

(71) Applicant: GM GLOBAL TECHNOLOGY OPERATIONS LLC, Detroit, MI (US)

(72) Inventors: Jessica Krajenke, Oxford, MI (US); Brian Edwards, Bruce Township, MI (US); Roman Mudel, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 272 days.

(21) Appl. No.: 15/365,822

(22) Filed: Nov. 30, 2016

(65) Prior Publication Data

US 2018/0149076 A1 May 31, 2018

(51) Int. Cl.
| | |
|---|---|
| *F02B 37/18* | (2006.01) |
| *F01D 17/10* | (2006.01) |
| *F02B 37/00* | (2006.01) |
| *F01D 25/04* | (2006.01) |
| *F01D 25/24* | (2006.01) |

(52) U.S. Cl.
CPC ............ *F02B 37/186* (2013.01); *F01D 25/04* (2013.01); *F01D 25/24* (2013.01); *F02B 37/00* (2013.01); *F01D 17/105* (2013.01); *F05D 2220/40* (2013.01); *F05D 2260/50* (2013.01)

(58) Field of Classification Search
CPC ...... F02B 77/13; F02B 37/186; F02B 37/183; F16B 37/044; F01D 17/105; F01D 25/04; F16C 11/02; Y10T 24/44778; F05D 2260/50; F05D 2220/40

USPC .............. 411/522; 24/99, 3.1; 60/602, 605.1
See application file for complete search history.

(56) References Cited

U.S. PATENT DOCUMENTS

| | | | | |
|---|---|---|---|---|
| 1,392,561 | A * | 10/1921 | Duffy ....................... | B62D 7/22 16/380 |
| 1,556,190 | A * | 10/1925 | Withrow .................. | F02M 1/00 74/503 |
| 3,427,897 | A * | 2/1969 | Engelmann ............. | F02D 11/04 411/520 |
| 5,423,646 | A * | 6/1995 | Gagnon ................ | F16B 37/041 411/174 |
| 6,101,686 | A * | 8/2000 | Velthoven ............... | F16B 5/065 24/289 |
| 6,928,705 | B2 * | 8/2005 | Osterland ........... | B60R 13/0206 24/289 |

(Continued)

Primary Examiner — Phutthiwat Wongwian
Assistant Examiner — Edward Bushard

(57) ABSTRACT

Provided herein are anti-rattle devices, and turbocharger wastegate assemblies including the same. The anti-rattle devices can include an elongated body having a first end and a second end, a first bend, wherein the first bend and the first end define a first section of the body, a second bend, wherein the first bend and the second bend define a second section of the body, and the second bend and the second end define a third section of the body, a first cavity defined by the first section, the first bend, and the second section, a second cavity defined by the second section, the second bend, and the third section, a first aperture positioned in the first section of the body; and a second aperture extending between the second section and the third section. The anti-rattle devices can mate with a turbocharger wastegate assembly and provide anti-rattling benefits.

20 Claims, 4 Drawing Sheets

(56) References Cited

U.S. PATENT DOCUMENTS

| | | | |
|---|---|---|---|
| 7,399,151 B2* | 7/2008 | Lubera | F16B 5/065 24/289 |
| 9,243,549 B2 | 1/2016 | Hinkelmann et al. | |
| 9,784,179 B2* | 10/2017 | Zieboll | F02B 37/186 |
| 2005/0217082 A1* | 10/2005 | Vassiliou | F16B 5/0614 24/294 |
| 2013/0333379 A1* | 12/2013 | Hinkelmann | F01D 17/105 60/602 |
| 2016/0003135 A1* | 1/2016 | Jaegle | F02B 37/186 60/602 |

* cited by examiner

ANTI-RATTLE DEVICES AND TURBOCHARGER WASTEGATE ASSEMBLIES INCLUDING THE SAME

INTRODUCTION

During a combustion cycle of an internal combustion engine (ICE), air/fuel mixtures are provided to cylinders of the ICE. The air/fuel mixtures are compressed and/or ignited and combusted to provide output torque. Many diesel and gasoline ICEs employ a supercharging device, such as an exhaust gas turbine driven turbocharger, to compress the airflow before it enters the intake manifold of the engine in order to increase power and efficiency. Specifically, a turbocharger is a centrifugal gas compressor that forces more air (i.e., oxygen) into the combustion chambers of the ICE than is otherwise achievable with ambient atmospheric pressure. The additional mass of oxygen-containing air that is forced into the ICE improves the engine's volumetric efficiency, allowing it to burn more fuel in a given cycle, and thereby produce more power. Turbocharger components are known to rattle and cause undesired noise and component wear.

SUMMARY

One or more embodiments provide anti-rattle devices. The anti-rattle devices can include an elongated body having a first end and a second end, a first bend, wherein the first bend and the first end define a first section of the body, a second bend, wherein the first bend and the second bend define a second section of the body, and the second bend and the second end define a third section of the body, a first cavity defined by the first section, the first bend, and the second section, a second cavity defined by the second section, the second bend, and the third section, a first aperture positioned in the first section of the body; and a second aperture extending between the second section and the third section. The first section and the second section can be substantially parallel. The first section and the second section can be angled relative to each other. The anti-rattle devices can be spring loaded. The anti-rattle devices can further comprise two tabs which extend radially outward from the first section. The two tabs can be each bent towards the second section such that they partially enclose the first cavity.

One or more other embodiments provide turbocharger wastegate assemblies incorporating anti-rattle devices. The turbocharger wastegate assemblies can include a turbine housing comprising an exhaust intake in fluid communication with a wastegate conduit, a wastegate positioned between the wastegate conduit and the exhaust intake, a rotatable shaft connected at one end to the wastegate and connected at an opposite end to the first end of an arm, a bushing disposed concentrically about the rotatable shaft, a rod protruding from a second end of the arm, an actuating member having an end with a rod aperture, and an anti-rattle device. The anti-rattle device can comprise an elongated body having a first end and a second end, a first bend, wherein the first bend and the first end define a first section of the body, a second bend, wherein the first bend and the second bend define a second section of the body, and the second bend and the second end define a third section of the body, a first cavity defined by the first section, the first bend, and the second section, a second cavity defined by the second section, the second bend, and the third section, a first aperture positioned in the first section of the body; and a second aperture extending between the second section and the third section. A portion of the bushing can be mated with the second aperture and occupy space within the second cavity. The arm can occupy space within the first cavity. The rod can protrude through the first aperture whereafter it is disposed through the rod aperture of the actuating member. The anti-rattle devices can further comprise two tabs which extend radially outward from the first section and are each bent towards the second section such that they partially enclose the first cavity. The two tabs can contact the arm. The first section and the second section can be angled relative to each other. The anti-rattle device can be spring loaded and apply a force between the rotatable shaft and the bushing to prevent or reduce rattling. The anti-rattle device can be spring loaded and apply a force to the actuating member end and the arm to prevent or reduce rattling.

Although many of the embodiments herein are described in relation to anti-rattle devices used for turbocharger wastegate assemblies, the embodiments herein are generally suitable for all wastegate assembly applications.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Provided herein are turbocharger wastegate actuator anti-rattle devices. Turbochargers are commonly used to enhance the efficiency of internal combustion engines (ICE), which generally include a cylinder block with a plurality of cylinders arranged therein. The ICE can be of a spark ignition or a compression ignition design and can generally include any number of cylinder arrangements and a variety of reciprocating engine configurations including, but not limited to, V-engines, inline engines, and horizontally opposed engines, as well as both overhead cam and cam-in-block configurations. Combustion chambers are formed within the cylinders between a bottom surface of a cylinder head and the top of an associated piston configured to reciprocate within the cylinder. The combustion chambers are configured to receive a fuel-air mixture for subsequent combustion therein. Air is provided to the cylinders via an intake manifold. Combustion creates an exhaust gas which is communicated to an appurtenant turbocharger.

Figure 1:
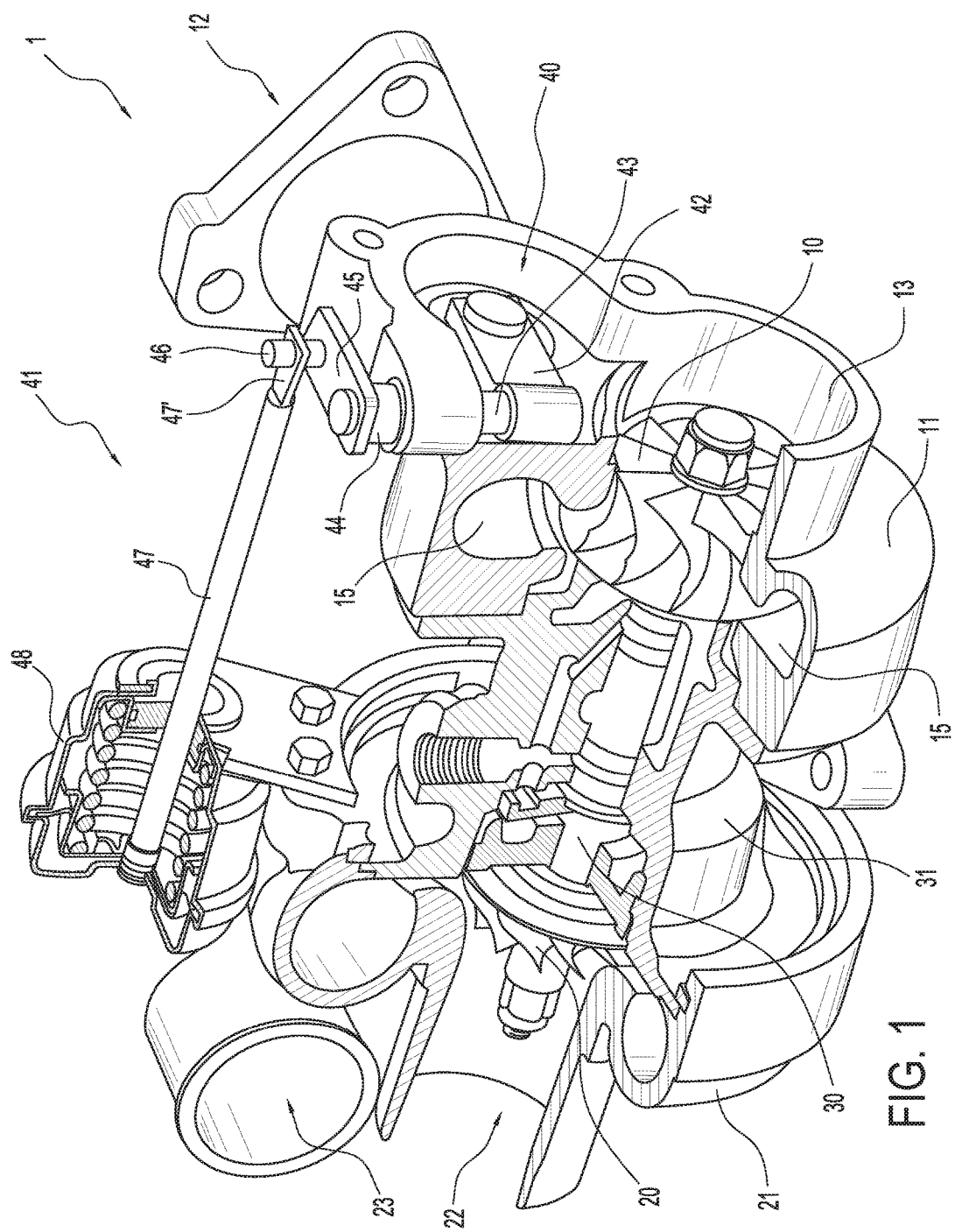
FIG. 1 illustrates a perspective view of a turbocharger, according to one or more embodiments.

Referring to the drawings wherein like reference numbers correspond to like or similar components throughout the several figures, FIG. 1 illustrates a turbocharger 1 which includes a turbine 10 disposed within a turbine housing 11, and a compressor 20 disposed within a compressor housing. The turbine 10 and the compressor 20 are mechanically coupled via a common rotatable shaft 30 which extends through a bearing housing 31. In operation, the turbine 10 receives exhaust gas from an ICE via a turbine exhaust intake 12. The intake 12 can communicate exhaust gas to the circumferential volute, or scroll, 15 which receives the exhaust gases and directs the same to the turbine 10. Exhaust gas thereafter is expelled from the turbine housing 11 via an exhaust conduit 13. The turbine 10 captures kinetic energy from the exhaust gases and spins the compressor 20 via the common shaft 30. Volumetric restrictions of the exhaust gas within the turbine housing 11 convert thermal energy into additional kinetic energy which is similarly captured by the turbine 10. For example, volute 15 can be particularly optimized to effect the conversion of thermal energy to kinetic energy. The rotation of the compressor 20 via the common shaft 30 draws in air through the compressor intake 22 which is compressed and delivered to the intake manifold of the appurtenant ICE via conduit 23.

The variable flow and force of exhaust gases introduced to the turbine housing 11 can influence the amount of boost pressure that can be imparted by the compressor 20 to the air drawn into the compressor housing 21 via compressor intake 22, and subsequently the amount of oxygen delivered to the ICE cylinders. In some instances, maximum translation of energy from exhaust gas to the compressor 20 is desired. In other instances, it is desired to limit boost pressure exerted by the compressor 20. Accordingly, a wastegate 42 is provided to limit the pressure and/or volumetric flow rate of the exhaust gas introduced into turbine housing 11. Generally, as referred to herein, a wastegate is any body capable of forming a fluid-tight seal with an aperture, or forming a seal which substantially or suitably limits fluid flow through an aperture. In the present example, wastegate 42 is positioned between the wastegate conduit 13 and the intake 12 and can actuate towards or to an open position and divert exhaust gas away from the turbocharger turbine 10 through a wastegate conduit 40 in order to limit the rotational speed of the turbine 10, and thereby limiting boost pressure. The wastegate conduit 40 can converge with exhaust conduit 13, for example. In a closed position, or while actuating towards a closed position, wastegate 42 can prevent or limit, respectively, exhaust gas flow to the wastegate conduit 40, and thereby maximize or increase, respectively, the rotational speed of the turbine 10.

Wastegate 42 is appurtenant to wastegate assembly 41, is configured to selectively divert exhaust gas towards the wastegate conduit 40 by actuating wastegate 42 to and between an open position and a closed position. Wastegate 42 is illustrated in FIG. 1 in a substantially closed position. Wastegate assembly further comprises a rotatable shaft 43 connected to the wastegate 42 within the turbine housing 11. A bushing 44 can be disposed concentrically about the rotatable shaft 43 to facilitate rotation of the shaft 43 and prevent or reduce contact between the shaft 43 and at least a portion of the turbine housing 11 or other components. Rotatable shaft 43 extends outward from the turbine housing 11 and connects to a first end of an arm 45. The arm 45 can be fixed to the shaft 43 and can, in some embodiments, extend outward to a second end in a substantially perpendicular orientation relative to the axial direction of the shaft 43. A rod 46 protrudes from a second end of arm 45 and is operatively connected to an actuating member 47. Rod 46 can be substantially perpendicular (i.e., within 2 degrees) with shaft 43, in some embodiments. In some embodiments, an end 47' of member 47 includes a rod aperture through which rod 46 is disposed. Actuator 48 is operatively connected to member 47 and is configured to manipulate arm 45 in order to actuate wastegate 42 to and between an open position and a closed position.

During operation, wastegate assembly 41 may cause undesired noise, rattling, and/or vibration (commonly known as "NVH"). Specifically, the shaft 43 may rattle against the bushing 44, and the arm 45 may rattle against the actuating member 47. Provided herein are anti-rattle devices, and wastegate assemblies and turbochargers utilizing the same, which minimize or eliminate undesired NVH.

Figure 2A:
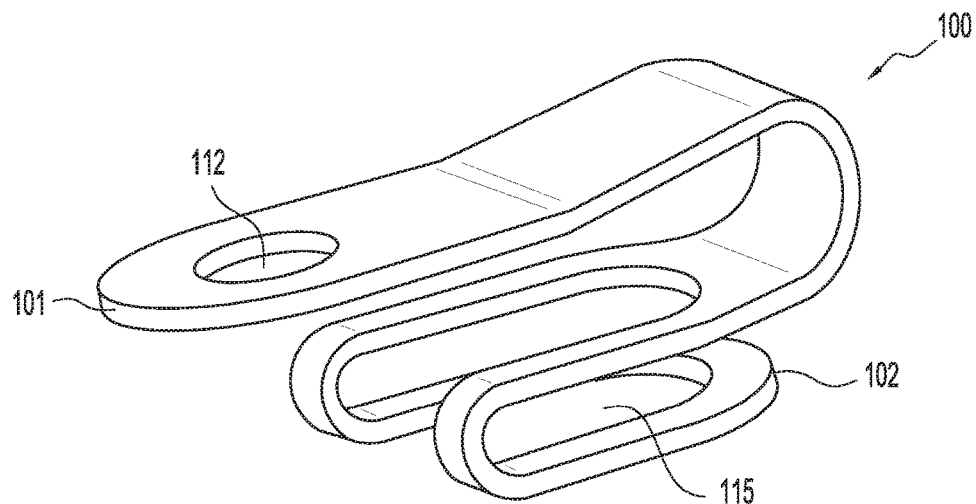
FIG. 2A illustrates a perspective view of an anti-rattle device, according to one or more embodiments.
Figure 2B:
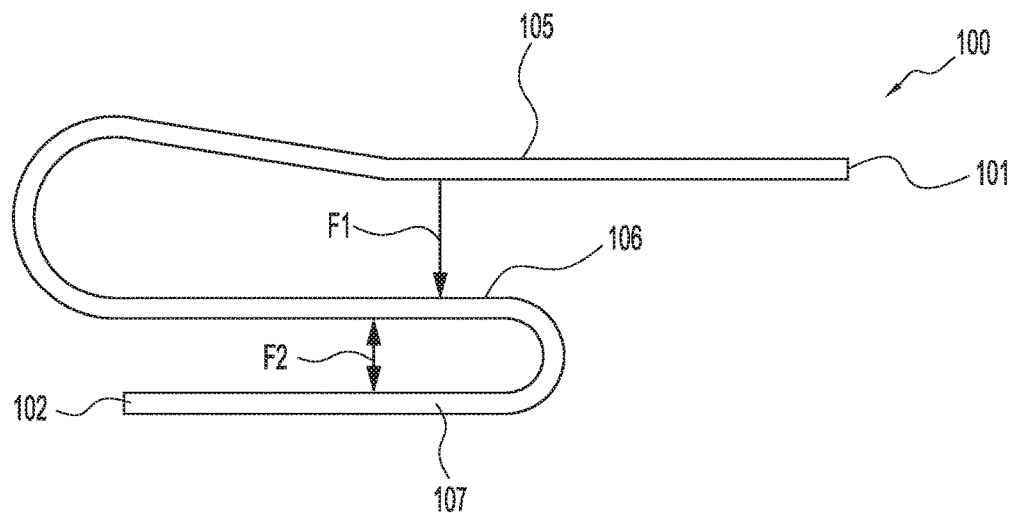
FIG. 2B illustrates a side view of anti-rattle device, according to one or more embodiments.
Figure 2C:
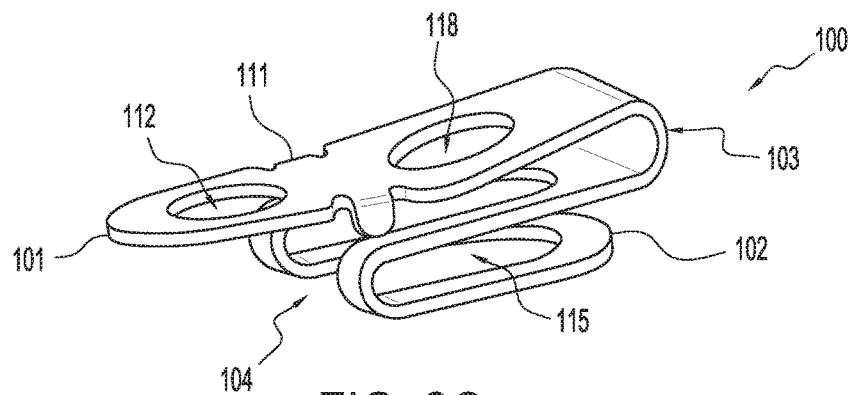
FIG. 2C illustrates a perspective view of an anti-rattle device, according to one or more embodiments.
Figure 2D:
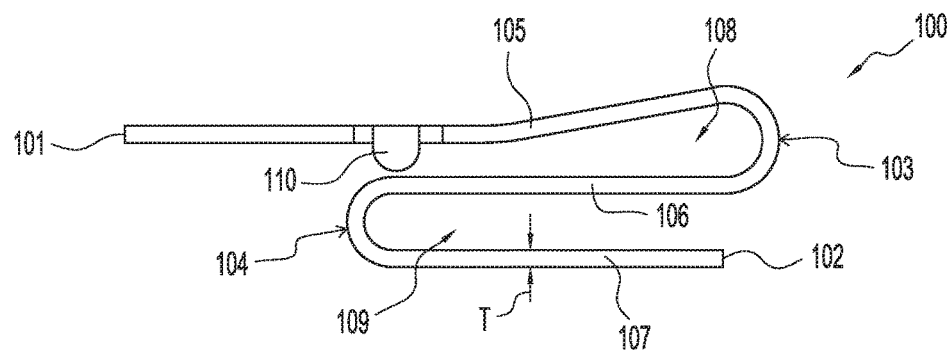
FIG. 2D illustrates a side view of anti-rattle device, according to one or more embodiments.

FIG. 2A illustrates a perspective view of an anti-rattle device 100. FIG. 2B illustrates a side view of anti-rattle device 100. FIG. 2C illustrates a perspective view of an anti-rattle device 100. FIG. 2D illustrates a side view of anti-rattle device 100. Device 100 comprises an elongated body 100' having a first end 101 and a second end 102, defining a length L in between. The body can have a thickness T. Thickness T can be substantially constant throughout the body, in some embodiments. The thickness T can be chosen to effect a desired spring force, as will be described below. In some embodiments, the thickness T can comprise about 0.3 mm to about 3.0 mm. A width W (shown in FIG. 2E) can remain constant or vary throughout the length L of the body. A first bend 103 and a second bend 104 define a first section 105 of the body, a second section 106 of the body, and a third section 107 of the body. First section 105 extends from first bend 103 towards the device first end 101. Second section extends between first bend 103 and second bend 104. Third section 107 extends from second bend 104 towards the device second end 102. First section 105, first bend 103, and second section 106 define a first cavity 108, and second section 106, second bend 104, and third section 107 similarly define a second cavity 109. Device 100 is spring loaded by virtue of the first bend 103 and second bend 104. As shown in FIG. 2B, a first force F1 is exerted by one or more of first section 105 and second section 106 drawing the sections toward each other. A second force F2 is exerted by one or more of second section 106 and third section 107, driving the sections apart. Accordingly, one or more of first section 105, second section 106, and third section 107 are capable of applying a force when mated with an object, as will be described below.

In some embodiments, second section 106 and third section 107 are parallel. In some embodiments, second section 106 and third section 107 are substantially parallel (i.e., within 3 degrees). In some embodiments, second section 106 and first section 105 are angled relative to each other. In some embodiments, second section 106 and first section 105 are angled relative to each other such that the distance between second section 106 and first section 105 proximate first bend 103 is greater than the distance between second section 106 and first section 105 proximate second bend 104. Device 100 can further comprise one or more optional tabs 110 and 111, shown in FIGS. 2C-E, which extend radially outward from first section 105 relative to length L. Tabs 110 and 111 are bent towards second section 106 such that they partially enclose first cavity 108.

Figure 2E:
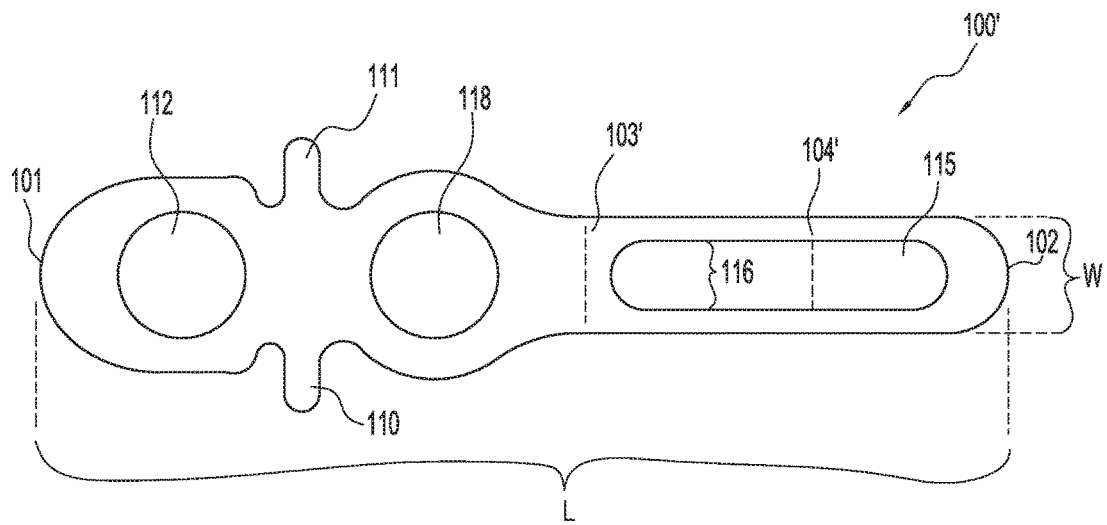
FIG. 2E illustrates a plan-view of an anti-rattle device elongated body, according to one or more embodiments.

FIG. 2D illustrates a plan-view of elongated body 100' (i.e., without first bend 103 and second bend 104). The approximate positions of first bend 103 and second bend 104 are denoted 103' and 104', respectively. Optional tabs 110 and 111 are also illustrated in an unbent position. Device 100 further comprises a first aperture 112 and a second aperture 115. As can be seen in FIGS. 2C and 2E, device 100 can optionally comprise a third aperture 118. First aperture 112 is positioned in first section 105, proximate first end 101. First aperture 112 is capable of accepting a rod of a wastegate assembly, such as rod 46 as will be described below. First aperture 112 can have a round cross section, in some embodiments. Second aperture 115 extends between second section 106 and third section 107. Second aperture 115 is capable of accepting a bushing of a wastegate assembly, such as bushing 44, as will be described below. Second aperture 115 can have a constant width 116, in some embodiments. Optional third aperture 118 can be positioned in first section 105 between first aperture 112 and first bend 103. Third aperture 118 is capable of accepting a wastegate assembly rotatable shaft, such as shaft 43, as will be described below.

Figure 3A:
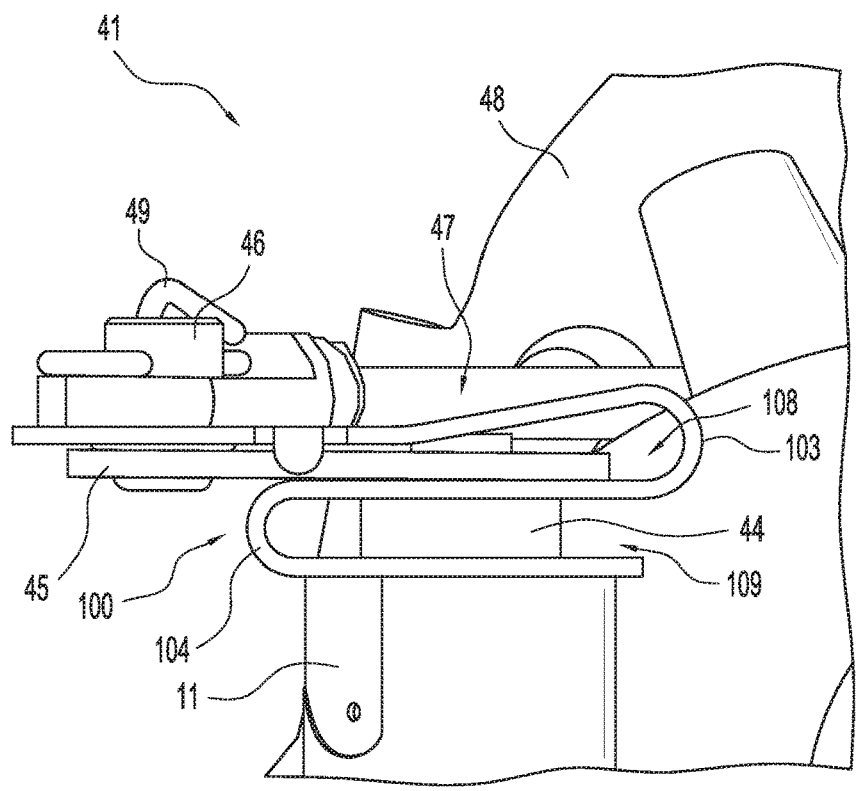
FIG. 3A illustrates a perspective view of a turbocharger wastegate assembly, according to one or more embodiments.
Figure 3B:
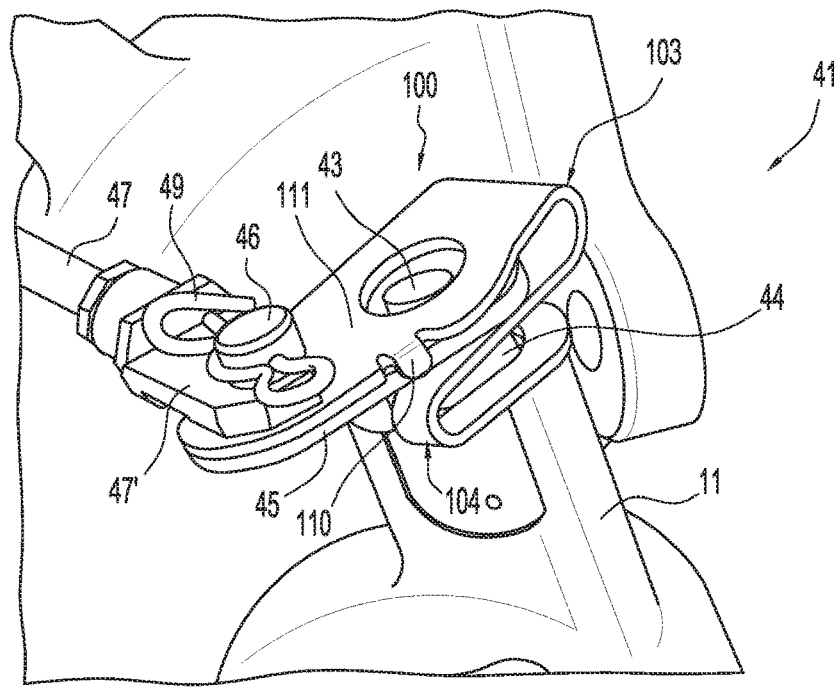
FIG. 3B illustrates a perspective view of a turbocharger wastegate assembly, according to one or more embodiments.

FIGS. 3A-B illustrate perspective views of a turbocharger wastegate assembly 41 including anti-rattle device 100. Device 100 is shown positioned such that bushing 44 occupies space in second cavity 109 by virtue of its orientation within second aperture 115. In some embodiments, second aperture 115 can comprise a width 116 which corresponds to the diameter of bushing 44 such that bushing 44 is capable of occupying the second aperture 115 but has restricted movement therein. Arm 45 occupies space in first cavity 108, and rod 46 protrudes through first aperture 112 whereafter it is operatively connected to member 47. Device 100 is spring loaded, and applies a force (i.e., F2) such that arm 45 is pressed away from bushing 44, and/or bushing 44 is pressed into turbine housing 11 such that rattling is prevented or reduced. Similarly, device 100 applies a force (i.e., F1) such that the member end 47' is pressed against arm 45 to prevent or reduce rattling. Force F1 further obviates the need for optional pin 49. Device 100 further provides similar anti-rattling effects between various other components of wastegate assembly 41.

Device 100 optional tabs 110 and 111 are shown bent downwards to contain arm 45 within first cavity 108. In some embodiments, optional tabs 110 and 111 are positioned in contact with arm 45 to prevent or reduce rattling. In some embodiments, rod 46 further optionally comprises an aperture with which a pin 49 can be mated. When pin 49 is mated with rod 46, the pin 49 serves to maintain the member end 47' in an axial location of the rod 46 between the pin 49 and the device 100 first section 105. In some embodiments, when pin 49 is mated with rod 46, the pin 49 serves to maintain the member end 47' in contact with the device 100 proximate first end 101. Device 100 can apply a force to member end 47' such that rattling between the pin 49 and arm 45 is reduced or prevented. Specifically, device 100 applies a force to actuating member end 47' and arm 45. In some embodiments optional third aperture 118 is positioned concentric with rotatable shaft 43. In some embodiments, rotatable shaft 43 extends through third aperture 118. In some embodiments, wastegate assembly 41 is utilized in non-turbocharger applications. Accordingly, turbine body 11 as illustrated in FIGS. 3A-B can comprise a pipe, or other body capable of directing or containing a fluid.

Device 100 can comprise metal, in some embodiments. Suitable metals are those capable of maintaining strength (i.e., spring load) at high temperatures. Steel is a suitable metal in some embodiments. In other embodiments, nick-chromium alloys can be utilized.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A turbocharger wastegate assembly anti-rattle device, the device comprising:
    an elongated body having a first end and a second end;
    a first bend, wherein the first bend and the first end define a first section of the body;
    a second bend, wherein the first bend and the second bend define a second section of the body, and the second bend and the second end define a third section of the body;
    a first cavity defined by the first section, the first bend, and the second section;
    a second cavity defined by the second section, the second bend, and the third section;
    a first aperture positioned in the first section of the body; and
    a second aperture extending between the second section and the third section;
    wherein the first end extends beyond the second bend and the first aperture is positioned beyond the second bend; and
    wherein the first aperture is configured to receive an actuator arm and the second aperture is configured to receive a wastegate rotatable shaft.

2. The device of claim 1, wherein the first aperture is positioned proximate the first end.

3. The device of claim 1, wherein the first aperture has a round cross section.

4. The device of claim 1, wherein the second aperture has a constant width.

5. The device of claim 1, wherein the second section and third section are substantially parallel.

6. The device of claim 1, wherein the first section and second section are angled relative to each other.

7. The device of claim 1, wherein the second section and first section are angled relative to each other such that the distance between the second section and the first section proximate the first bend is greater than the distance between the second section and the first section proximate the second bend.

8. The device of claim 1, further comprising two tabs which extend radially outward from the first section.

9. The device of claim 8, wherein the two tabs are each bent towards the second section such that they partially enclose the first cavity.

10. The device of claim 1, wherein the device is spring loaded.

11. The device of claim 10, wherein a first force is exerted such that the first section and the second section are drawn towards each other, and a second force is exerted such that the second section and the third section are drawn apart.

12. The device of claim 1, wherein the body comprises metal.

13. A turbocharger wastegate assembly, the assembly comprising:
   a turbine housing comprising an exhaust intake in fluid communication with a wastegate conduit;
   a wastegate positioned between the wastegate conduit and the exhaust intake;
   a rotatable shaft connected at one end to the wastegate and connected at an opposite end to the first end of an arm;
   a bushing disposed concentrically about the rotatable shaft;
   a rod protruding from a second end of the arm;
   an actuating member having an end with a rod aperture; and
   an anti-rattle device comprising:
      an elongated body having a first end and a second end;
      a first bend, wherein the first bend and the first end define a first section of the body;
      a second bend, wherein the first bend and the second bend define a second section of the body, and the second bend and the second end define a third section of the body;
      a first cavity defined by the first section, the first bend, and the second section;
      a second cavity defined by the second section, the second bend, and the third section;
      a first aperture positioned in the first section of the body; and
      a second aperture extending between the second section and the third section,
      wherein a portion of the bushing is mated with the second aperture and occupies space within the second cavity, and the arm occupies space within the first cavity and the rod protrudes through the first aperture whereafter it is disposed through the rod aperture of the actuating member.

14. The turbocharger wastegate assembly of claim 13, wherein the anti-rattle device further comprises two tabs which extend radially outward from the first section and are each bent towards the second section such that they partially enclose the first cavity.

15. The turbocharger wastegate assembly of claim 14, wherein the two tabs contact arm.

16. The turbocharger wastegate assembly of claim 13, wherein the rod further comprises a pin aperture with which a pin can be mated, and the pin aperture is located such that the actuating member end is maintained in an axial location of the rod between the pin and the first section of the anti-rattle device.

17. The turbocharger wastegate assembly of claim 13, wherein the second aperture comprises a width which corresponds to the diameter of the bushing.

18. The turbocharger wastegate assembly of claim 13, wherein the anti-rattle device is spring loaded and applies a force between the rotatable shaft and the bushing to prevent or reduce rattling.

19. The turbocharger wastegate assembly of claim 13, wherein the anti-rattle device is spring loaded and applies a force to the actuating member end and the arm to prevent or reduce rattling.

20. The turbocharger wastegate assembly of claim 13, wherein the first section and the second section are angled relative to each other.

* * * * *